United States Patent [19]

Genz

[11] 4,121,185

[45] Oct. 17, 1978

[54] LINEAR POSITION SENSOR

[75] Inventor: Earl James Genz, Des Plaines, Ill.

[73] Assignee: Illinois Tool Works Inc., Chicago, Ill.

[21] Appl. No.: 816,552

[22] Filed: Jul. 18, 1977

[51] Int. Cl.² .............................................. H01F 21/06
[52] U.S. Cl. ..................................... 336/110; 365/62;
340/197; 340/365 L; 400/479
[58] Field of Search ................. 336/110, 132; 335/229;
197/98; 340/365 R, 365 L, 195, 197, 196;
307/88 MP, 88 LC; 365/62

[56] References Cited

U.S. PATENT DOCUMENTS 3,698,531  10/1972  Bernin ............................. 336/110 X

*Primary Examiner*—Thomas J. Kozma
*Attorney, Agent, or Firm*—Glenn W. Bowen; Robert W. Beart

[57] ABSTRACT

An improved linear position sensor that utilizes a pair of elongated magnetically permeable tubular sensing elements and a pair of elongated magnets positioned to move with respect to the tubular sensing elements is disclosed. The sensor is provided with a housing structure having a pair of guide slots which guide a support plate for the tubular sensing elements, and a second pair of guide slots formed at right angles to the first pair of guide slots, which guide a pair of wings on the control member that carries the magnets, so that the elongated tubular sensing elements and the magnetic elements are accurately retained in place with respect to each other. The housing is formed with channels in its interior which receive a pair of elongated coil springs that bias the member. The structure is designed for ease of assembly with snap-together sub-assemblies.

12 Claims, 6 Drawing Figures

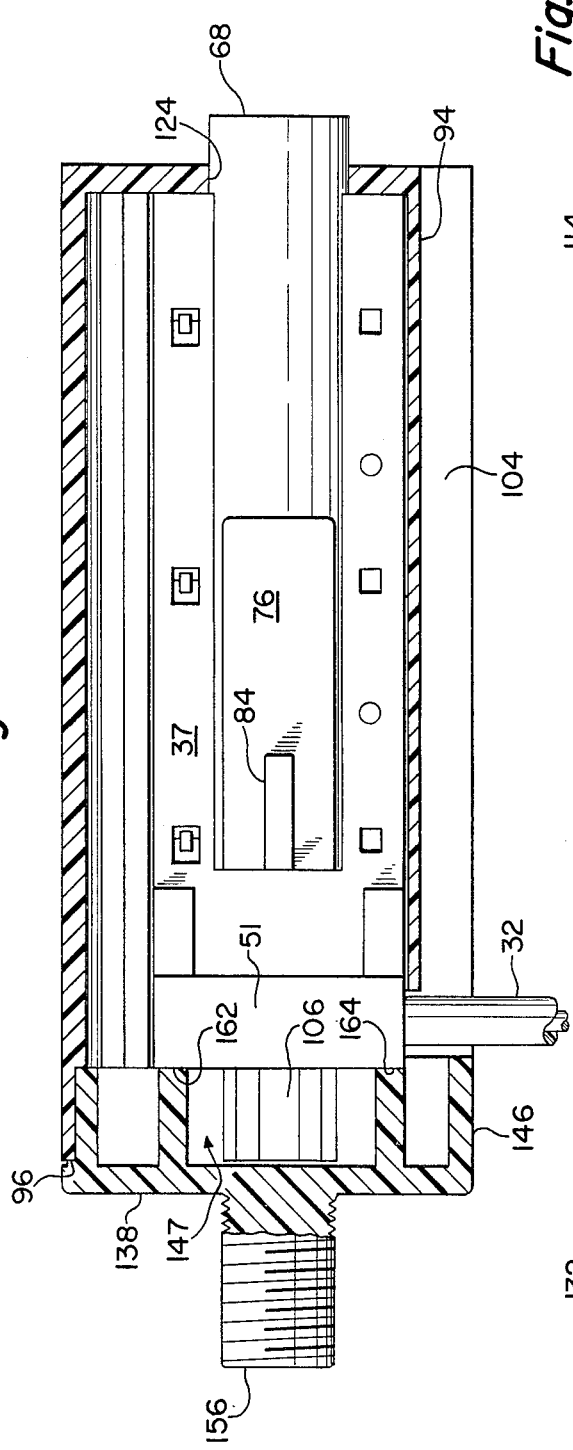
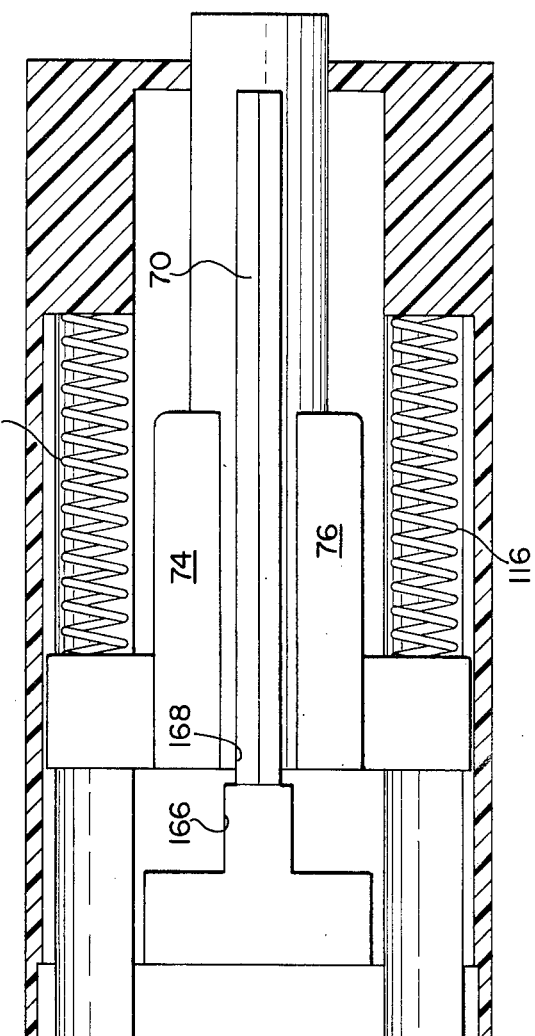
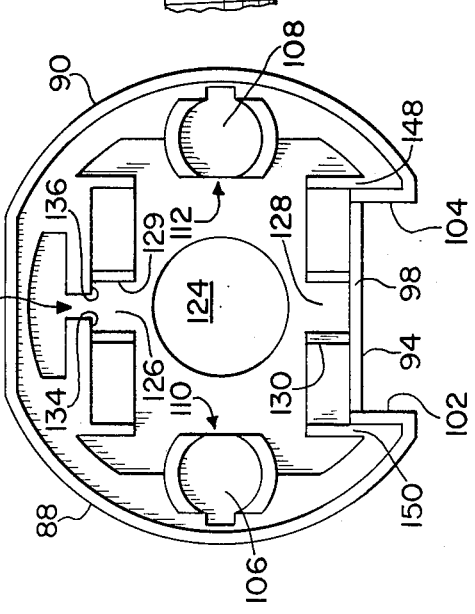

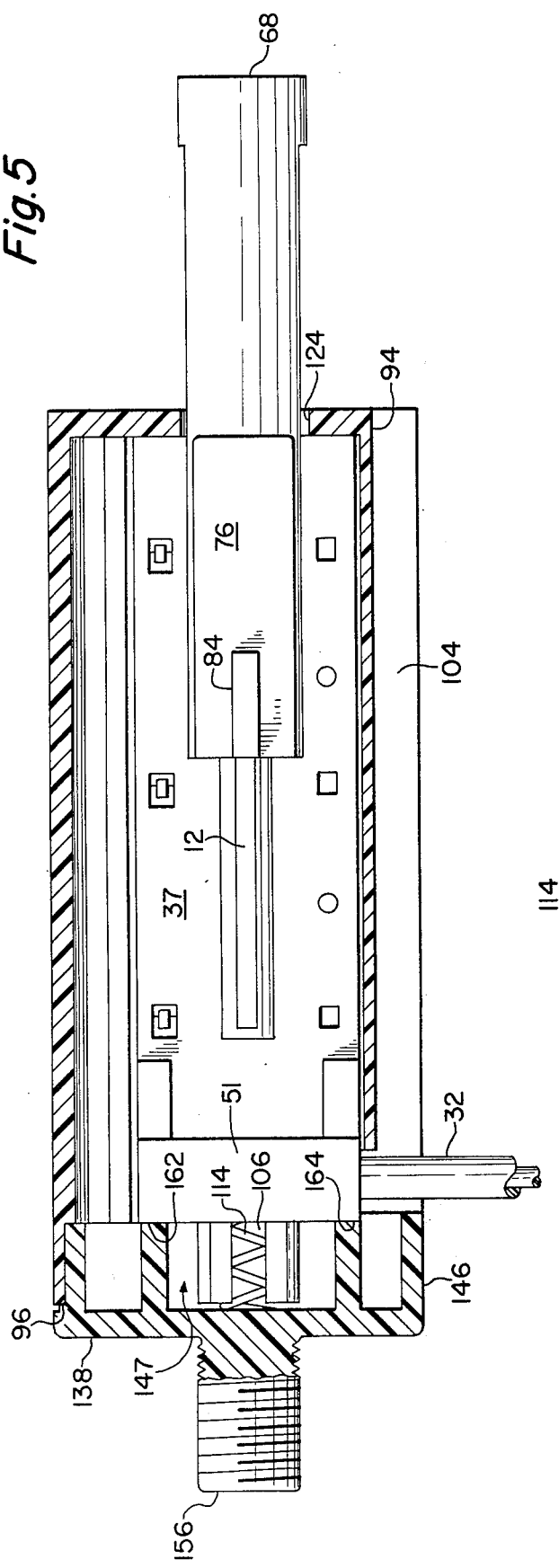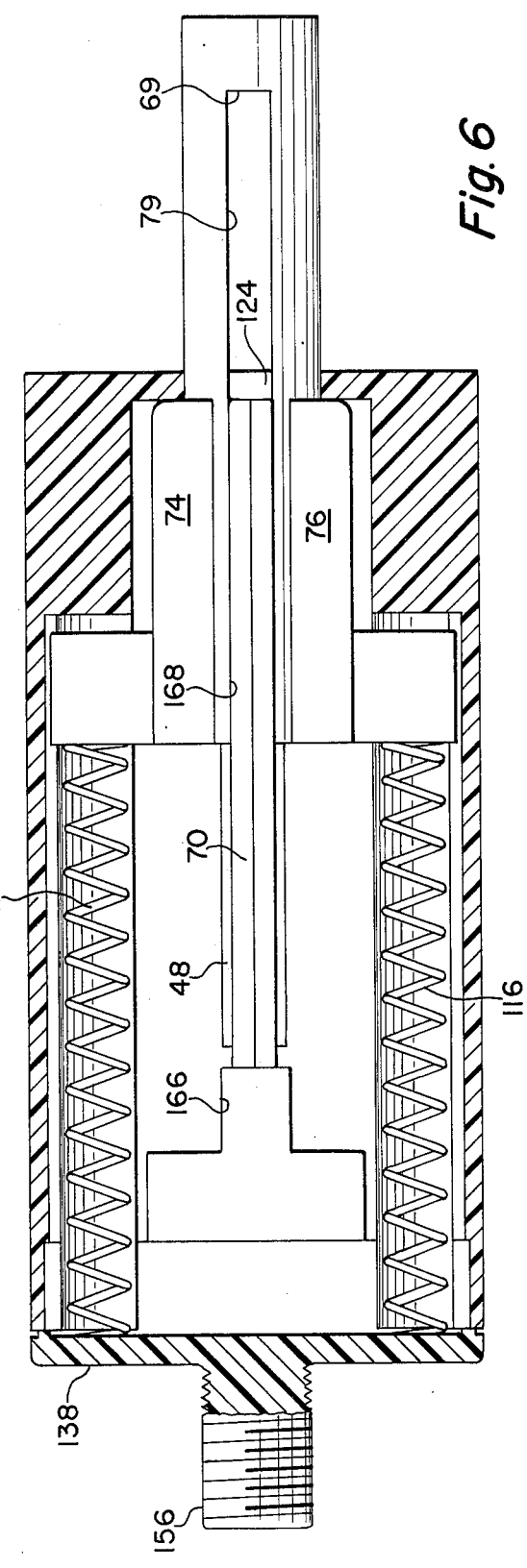

LINEAR POSITION SENSOR

BACKGROUND OF THE INVENTION

The present invention relates to a linear positional sensor which utilizes a pair of hollow, elongated sensing tubes constructed of a magnetically saturable material. At least one sense wire runs through each of the tubular sensing elements parallel to its elongated axis and a pair of oppositely poled magnets are positioned adjacent diametrically opposite surface portions of the sensing elements so that the magnetic flux from the magnets will substantially saturate the portion of the tubular sensing elements that lie therebetween, while the remaining portion of these sensing elements will remain relatively unsaturated. The positional sensor that is thus formed provides an extremely accurate linear indication of the position of the magnets with respect to the tubular sensing elements. Because the tubular sensing elements provide a closed flux path, there is no substantial fringing effect near the ends of the saturating magnets and, therefore, the portion of the sensing elements that are not between the magnets will remain substantially unsaturated. More specific details relating to the general type positional transducer that may be utilized in the improved sensor of the present invention is shown in Victor M. Bernin U.S. Pat. No. 3,958,203 issued May 18, 1976 to the assignee of the present invention, and this patent is herein incorporated by reference.

In the past, sensing elements of the described type were installed in their housings and adjusted to an initial position, whereupon they were then staked, or locked, into place. In the improved design of the present invention, a molded threaded stud for adjustment of the position of the plunger or control member is integrally formed as part of the end cap of the housing assembly. The housing has a flat on it which keeps it from rotating during adjustment and the sensor is mounted in a fixture during adjustment which should have a mating flat. An adjusting nut may then be screwed onto the stud to adjust the plunger or control member to their proper position. Once the desired position of the plunger or control member is reached, a lock nut, or lock tabs, may be used to keep the adjusting nut from turning.

The improved sensor is very easily assembled, since the elongated magnetically permeable tubular sensing elements are retained in place by two snap-together sections which form a relatively flat support plate for the elements. The two members of the support plate may be snapped onto an ultrasonically welded wire holding block which holds the interconnecting wire leads that connect the sensor to a remote connector. The interconnecting leads are relatively large wires, while the wires that thread the sensing elements are much smaller in diameter and run through a channel formed in the support plate for the elongated sensing elements for substantially most of their lengths. Only small portions of the wires that thread the sensing elements extend from the support plate and these are wrapped around and soldered to the bare end portions of the interconnecting wires which project through the wire holding block at substantially a right angle with respect to the elongated tubular sensing elements and the direction of orientation of the small sense wires that are threaded through the sensing elements.

The movable control member sub-assembly, which holds a pair of opposed permanent magnets has a central slot in it which receives the support plate for the sensing elements and thereby allows the magnets to be positioned directly over diametrically opposite portions of the tubular sensing elements. When the magnets are thus located, the movable control member sub-assembly is secured in place with respect to the support plate, and these two sub-assemblies may then be inserted together as a unit into the housing. The housing is provided with a pair of vertically oriented slots which receive and guide the support plate. The housing is also formed with a pair of horizontally disposed slots that are cut through two parallel, cylindrically shaped sections formed on the inner wall of the housing, each of which receives a wing that extends from the movable actuator of the control member sub-assembly, thereby guiding and positioning the control member sub-assembly with respect to the sensing elements. An elongated coil spring is inserted into each of these elongated cylindrical channels to provide a return bias for the control member sub-assembly. The sensor of the present invention, therefore, insures that the tubular sensing elements and the control magnets that are carried by the actuator are correctly positioned relative to each other at all times and, in addition, provides a structure that is easily assembled and adjusted.

The positional transducers of the present invention are very linear in response, are contactless, are very accurate and reliable and capable of functioning in severe environments and are in addition relatively low in cost. Moreover, the magnet force that is required to operate the device is not critical, because of the reliance on the saturation of the tubes between the magnets to produce the output signal.

DESCRIPTION OF THE DRAWINGS

The present invention is described by reference to the drawings in which:

FIG. 2 is a side cross-sectional view of the assembly of FIG. 1;

FIG. 3 is a top cross-sectional view of the assembly of FIG. 1;

FIG. 4 is an end view of the housing of the sensor;

FIG. 5 is a side cross-sectional view of an alternate embodiment of the sensor; and FIG. 6 is a top cross-sectional view of the alternate embodiment of FIG. 5.

TECHNICAL DESCRIPTION OF THE INVENTION

Figure 1:
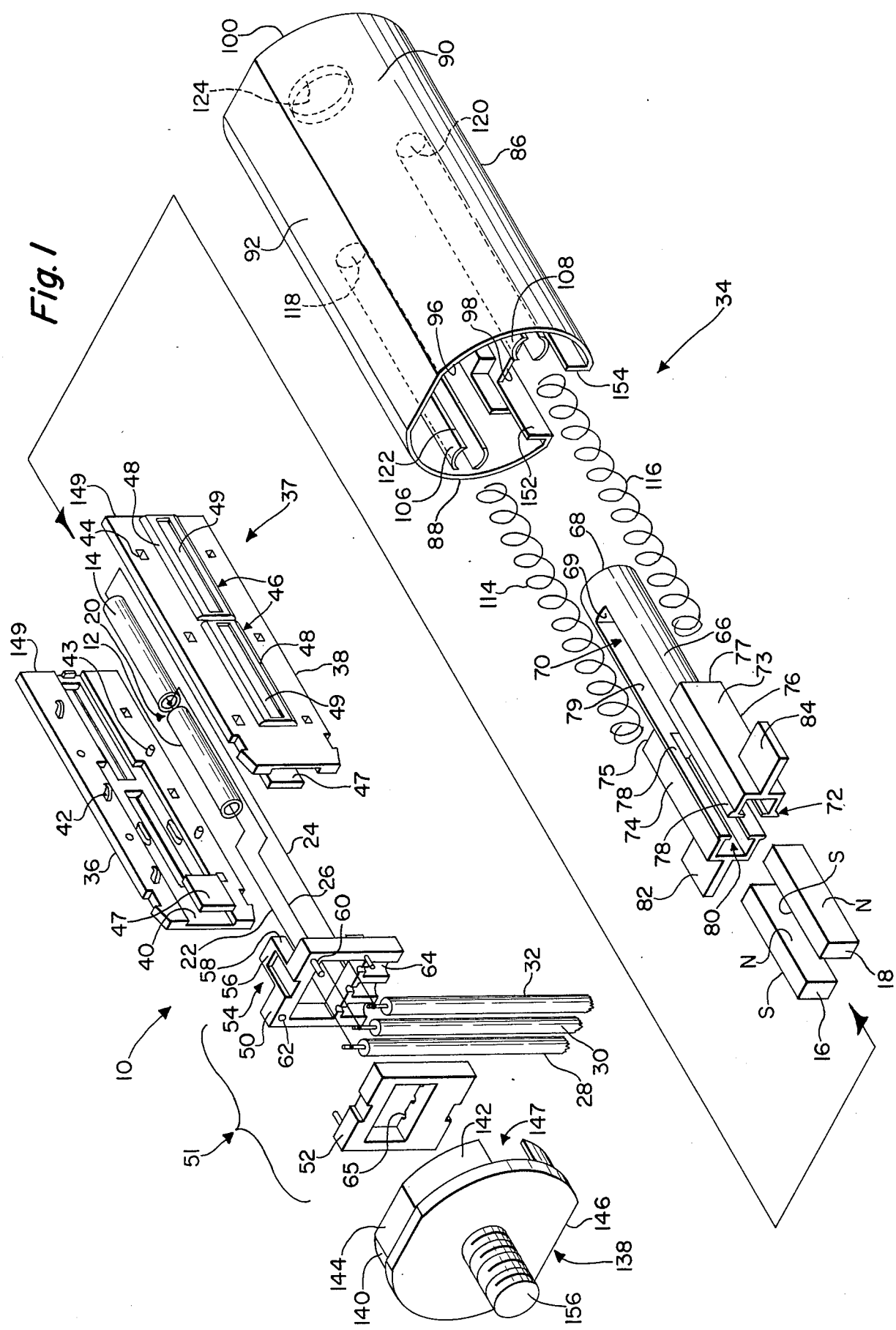
FIG. 1 is an exploded perspective view which shows the complete assembly of the sensor of the present invention.

The improved linear position sensor 10 of the present invention is shown in the drawings in which the two sensing elements are the elongated, hollow tubular elements 12, 14, which are made of a magnetically permeable and saturable material. The pair of permanent magnets 16, 18, which are preferably polarized as shown so that oppositely poled magnetic poles face each other, are positioned adjacent the sensing elements 12, 14 during operation of the sensor so that the sensing elements are positioned between the magnets 16, 18 and in close proximity thereto. The length of each of the magnets 16, 18 is on the order of the length of one of the tubular sensing elements 12, 14. Therefore, if the magnets 16, 18 are positioned so that the space 20 between the inner ends of the elements 12, 14 substantially bisects the centers of the magnets 16, 18, the volume of each of the sensing elements 12, 14 that is magnetically saturated will be substantially equal. This condition, therefore, defines the null, or initial, position of the magnets. The sensing elements 12, 14 each have at least one sense wire 22, 24 that extends through them. When only one wire threads each of the hollow tubular sensing elements 12, 14, these elements act as inductances. An alternate method of operation of the sensor may be provided by threading a drive winding through each of the sensing elements 12, 14, which receives a time-varying voltage signal so that the elements 12, 14 act as a controllable differential sensor.

The ends of the sense wires 22, 24 are connected together and to a third relatively small diameter wire 26. The sense wire 22 is wrapped around and soldered to the bare terminal portion of the lead wire 28, the sense wire 26 is connected to the bare terminal portion of the lead wire 30, and the sense wire 24 is connected to the bare terminal portion of the lead wire 32.

A basic sensor utilizing hollow, elongated sensing elements of magnetically permeable and saturable material which is positioned between a pair of movable permanent magnets is shown in the aforementioned Bernin U.S. Pat. No. 3,958,203. The present invention is directed to an improved version of this sensor wherein motion of the magnets 16, 18 due to the application of a force on the control member 34 causes one of the elements 12, 14 to become more saturated while the other element becomes less saturated, according to the direction of this motion. In either case, the change in the magnetic saturation of the two elements provides an output signal that is linearly related to the position of the control member 34. As the magnets 16, 18 move back and forth, they substantially saturate the portion of the volumes of the sensing elements 12, 14 that lie between them, while the remaining portion of the volumes of these elements remain substantially unsaturated. Although there will be some degree of saturation in the vicinity of the boundary line between the "saturated" and "unsaturated" areas, the amount of such saturation will be relatively small because of the proximity of the magnets to each other and of the closed magnetic flux path that is provided by the walls of the tubular sensing elements 12, 14.

The length of the tubular sensing elements 12, 14 is dependent upon the type and accuracy of sensing that is desired. The elongated dimension of the tubular sensing elements 12, 14 will generally be at least one-half inch, if relatively accurate sensing is required. The length of the magnets 16, 18 is preferably the same length as a sensing element.

The sensing elements 12, 14 are secured in place relative to each other by two mating, preferably identical, snap-together sections 36, 38, which form an elongated support plate 37 for the elements. The sense wires 22, 24, 26 extend out of the forward end of the plate 37 through a channel 40 that is provided by two sections 36, 38. An elastomeric pad 47 may be placed in the channel 40 to help protect wires 22, 24, 26 from shock and vibration, or alternately, a potting compound might be poured into the channel for a similar purpose. The two sections 36, 38 of the plate 37 are held together by means of locking tabs 42 and pins 43 in one section and corresponding apertures 44 in the mating section. A pair of pockets 46 are provided in the sections 36, 38 by the ribs 48 to provide for support of the elements 12, 14 with a surface portion of these elements being exposed through the openings 49 between the ribs 48. These pockets precisely locate the position of the sensing elements 12, 14 and provide a measure of protection to the elements from shock and vibration.

The lead wires 28, 30, 32, which go to a remote connector, are supported in a vertical position, as shown in FIG. 1, so that they are substantially normal to the horizontal orientation of the tubular sensing elements 12, 14 and the sense wires 22, 24, 26. The lead wires 28, 30, 32 are supported by the wire support block 51 that is formed of two mating sections 50, 52. The block section 50 has a protruding ledge 54 which is formed of a bottom wall 56 and two side walls 58. These walls receive the rear portion of the sections 36, 38 when they are secured together to form the support plate 37. The block 51 and the sections 36, 38 may be sealed together ultrasonically or by other means, or a snap lock fit may alternatively be provided. The block sections 50, 52 are mated together by pins 60 in one section and corresponding holes 62 in the mating section. Semi-circular grooves 64 are formed in both of the block sections 50, 52 so that when the two sections are snapped or otherwise secured together a complete circular cylindrical groove will be formed to receive the wires 28, 30, 32. Small semi-circular grooves 65 are also formed above the grooves 64 to receive the bare terminal ends of the wires 28, 30, 32.

The sections 36, 38, which form the support plate 37 for the sensing elements 12, 14 and the block 51 along with the lead wires 28, 30, 32, together comprise a sub-assembly. A second sub-assembly is formed by the control member 34 and the permanent magnets 16, 18. The control member 34 is preferably formed of a plastic material which is magnetically and electrically insulating. It has an elongated plunger 66 with a cylindrically shaped end 68 that is coupled to a movable member, the position of which is to be sensed. An elongated, centrally located slot 70 is provided which extends from the end 68 through the remainder of the plunger 66 so as to provide an open end 72. Coupling to the movable member to be sensed may be made through the slot 70, if desired. At the open end 72 of the plunger 66, a pair of rectangular shaped magnet retainers 74, 76 are each provided with two "T-shaped" bases 78 which provide for an elongated slot 80 between the base sections 78 of each of the magnet retainers. The T-shaped bases 78 are an extension of the interior walls 79 that form the slot 70.

The permanent magnets 16, 18 are, respectively, placed in the magnet retainers 74, 76 of the plunger 66. The plunger 66 is formed with a pair of wings 82, 84, which extend upwardly from the magnet retainers 74, 76. The width of the slot 70 is just slightly wider than the combined width of the sections 36, 38 when they are assembled together to form the plate 37 and, therefore, the inner faces of the magnets 16, 18 will be in close proximity to the outer surfaces of the elements 12, 14 which partially project through the openings 49. The bases 78 of the retainers 74, 76 and the remaining portion of the walls 79 are thereby guided along the outer surfaces of the support plate 37. Because of the relatively strong amount of magnetic attraction that will exist between the permanent magnets 16, 18 and the two sensing elements 12, 14, the sub-assembly 34 consisting of the plunger 66 and the magnets 16, 18 may be placed to receive the support plate 37 in the slot 70, and the sub-assembly 34 will then remain attached to the sub-assembly 10 even when the sub-assembly 10 is positioned so that the sensing elements have their axes oriented in the vertical direction. This feature greatly simplifies the assembly of the sensor since the sub-assemblies 10, 34 may then be handled as a single unit.

The housing 86 of the sensor is best shown in FIGS. 1 and 4. Preferably, the housing and the others parts of the sensor with the exception of the sensing elements, the permanent magnets and the wires, are formed of plastic materials. The housing 86 is formed with a pair of side walls 88, 90 that are sections of a circular cylinder. An upper flat wall 92 interconnects the side walls 88, 90. The lower portion of the housing is formed with a lower flat wall 94 (FIG. 4) which begins at a distance slightly to the rear of the end 96 of the walls 88, 90 and extends from the edge 98 along the entire length of the bottom of the housing 86 to the front wall 100. Two side walls 102, 104 extend downwardly from the flat section 94 to provide a guide channel for guiding hook-up wires for connecting to the sensor.

The interior of the housing 86 is provided with a pair of cylindrically shaped channels 106, 108, which extend along the entire length of the walls 88, 90. Slots 110, 112 are provided in the channels 106, 108 which run along the entire length of the channels. Elongated coil springs 114, 116 may be positioned in the channels 106, 108, respectively, as shown in FIG. 1, so that their forward ends abut against the faces 118, 120 of their respective channels and their rearward ends against the wings 82, 84. The slots 110, 112 that are formed in the channels 106, 108 receive the wings 82, 84 of the plunger 66 when the sub-assembly 34 is inserted into the housing 86. The sides of the channels 106, 108 are formed to have flat guide surfaces 122 which guide the outer surfaces 73 of the magnet retainers 74, 76 as the control sub-assembly 34 moves back and forth with respect to the fixed sensing elements 12, 14 and the sensing element support sub-assembly 10. The plunger 66 is thereby located with respect to the housing 86 and is guided so that it can only move back and forth along the elongated dimension of the housing 86. The forward end 68 of the plunger 66 extends through a centrally located aperture 124 in the forward end 100 of the housing 86 and the movable member to be sensed is somehow coupled to the plunger 66, as for example, through the slot 70.

An alternate embodiment of the present invention is shown in FIGS. 5 and 6. The only difference between this embodiment and the one described above is that the springs 114, 116 are placed in the channels 106, 108 behind, instead of in front of, the wings 82, 84 of the plunger 66. Thus, the plunger 66 of this embodiment is biased forward so that the plunger end 68 comes into contact with the member to be sensed in a manner which tends to force the plunger 66 more or less into the housing 86 against compressive forces of the springs 114, 117, instead of being pulled away from the housing against tension forces of the springs 114, 116, as occurs with the embodiment of FIGS. 2 and 3.

In order to accurately position the support plate 37 for the sensing elements 12, 14 with respect to the housing 86 and the magnets 16, 18, the housing is provided with a pair of vertically disposed slots, one of the slots 126 being formed in the upper portion of the housing and the other slot 128 being formed in the lower portion of the housing. The side walls 129 of the slot 126 serve to guide the upper surfaces of the support plate 37 while the side walls 130 of the slot 128 guide the lower surfaces of the support plate 37. A small slot 132 of a smaller width than the width of the slot 126 is formed above the slot 126 and the downward facing walls 134, 136 between these slots serve to guide the upper surfaces of the end of the support plate 37. The steps 166, 168 which are formed in the housing 86 (FIG. 3) allow for easier insertion of the support plate 37 into the slots 126, 128. The sections 36, 38 of the support plate 37 are thus accurately positioned at substantially a right angle with respect to the wings 82, 84 of the plunger 66 when they are assembled together. The sensing elements 12, 14 are, therefore, accurately positioned with respect to the permanent magnets 16, 18 so that there is a substantially constant distance between the outer surface of the elements 12, 14 and the inner faces of the magnets 16, 18, which form the magnetic poles, as the magnets 16, 18 are to move back and forth with respect to the sensing elements 12, 14.

The control sub-assembly 34 and the sensing element support sub-assembly 10 are pushed forward into the housing 86 as a unit. The recessed wall 98 on the lower portion of the housing 86 allows the wire support block 51 to be received in the recess thus formed so that the lead wires 28, 30, 32 will project downwardly between the end cap 138 and the rear edge 96 of the housing, as best shown in FIG. 2. The end cap 138 is provided with cylindrically shaped side walls 140, 142, which match the side walls 88, 90 of the housing 86, and also an upper flat wall 144 and a lower flat wall 146. The upper flat wall 144 and the side walls 140, 142 extend inwardly into the housing 86. The side walls 140, 142 each have an open area 147 formed in them which allows the end of a channel 106, 108 to be received therein when the cap 138 is positioned on the housing 86. The cap 138 is also formed with a pair of vertically disposed grooves 148, 150, which receive the upwardly extending ledges 152, 154 that are integrally formed on the housing 86. This serves to guide the cap into position and to hold it on the end of the housing 86. The rear end 96 of the walls 88, 90 (FIG. 2) serves as a stop for the end cap 138 when it is assembled to the housing 86.

The end cap 138, when it is positioned on the end of the housing 86, has its walls 140, 142, 144, 146 located in the interior of the housing 86. The cap 138 is thus movable back and forth with respect to the housing 86 along the ledges 152, 154 in the grooves 148, 150. The rear surfaces of the block 51 engage the cap 138, as shown in FIG. 2. A threaded stud 156 that is integrally formed on the cap 138 extends from the rear of the cap. During adjustment of the sensor, the stud 156 may extend through an aperture in a fixture that has a flat locating surface that is positioned against the flat wall 92 of the housing 86. An adjusting nut may then be screwed onto the stud 156 to adjust the position of the sub-assembly 10 since the forward edges 162, 164 of the cap 138 engage the rear surfaces of the wire block 52, when the sensor is assembled. The projecting end 68 of the plunger 66 will be positioned forward until it extends through the aperture 124 by a predetermined amount during this adjustment process. By using the signals that are developed by the sensing elements 12, 14, the initial position of the sensing elements 12, 14 with respect to the magnets 16, 18 may be accurately set so that the required starting point is achieved.

The extreme forwardmost position of the control sub-assembly 34 is limited by the contact of the front edges 75, 77 of the magnet retainers 74, 76 with the rear surface of the front wall 100 of the housing 86. The extreme rearwardmost position of the plunger 66 is limited by the wall 69 in the slot 70 since this wall will contact the forward ends 149 of the sections 36, 38 of the support plate 37 when it is secured in place in the housing and adjusted in position with respect to the end cap 138 in the manner previously described.

What is claimed is:

1. A linear position sensor comprising a pair of elongated magnetically affected sensing means, each having an elongated axis, a generally rectangular-shaped support means which supports said sensing means so that said axes are aligned with each other, a pair of elongated permanent magnets, an elongated control means which holds said magnets, said control means having a centrally located slot that runs part way therethrough in the direction of its elongated dimension and said support means is received therein so that opposite magnetic poles of said magnets face each other and said sensing means are received intermediate said poles and adjacent thereto, said control means further comprising a sensing end that extends from said control means at the end of said slot in said control member, a housing which receives said support means and said control means therein so that said control means is movable relative to said support means, having a closure wall with an aperture therein through which said sensing end projects and an elongated side wall which extends from said closure wall, and bias means in said housing for biasing said control means in a predetermined direction with respect to said closure wall.

2. A linear position sensor as claimed in claim 1, wherein said sensing means comprises a pair of hollow, tubular sensing elements made of a magnetically saturable material and at least one sense wire is threaded through each of said sensing elements.

3. A linear position sensor as claimed in claim 1, wherein said housing has a first pair of slots aligned in a first direction which receives said support means therein thereby aligning said support means relative to said housing and a second pair of slots aligned in a second direction that is substantially normal to said first direction and said control means has a pair of aligned wings thereon which extend outwardly in opposite directions and are each received in one of said slots of said second pair of slots thereby aligning said control means relative to said housing and said support means.

4. A linear position sensor as claimed in claim 3 wherein said bias means comprises a pair of elongated coil springs and said housing comprises a pair of spaced apart channels that run along the inner surface of said wall and each of which receive one of said coil springs therein.

5. A linear position sensor as claimed in claim 4 wherein said second pair of slots comprise a slot formed in each of said channels which runs along substantially its entire length.

6. A linear position sensor as claimed in claim 5 wherein said sensing means comprises a pair of hollow, tubular sensing elements made of a magnetically saturable material and at least one sense wire is threaded through each of said sensing elements.

7. A linear position sensor as claimed in claim 1, wherein said sensor comprises a plurality of relatively large diameter wires which couple the output of said sensor to a remote location wherein the terminal ends of said large diameter wires are positioned substantially normal to the direction of orientation of the axes of said sensing means and a wire support block which supports said large diameter wires is secured to the end of said support means at a point remote from said closure wall.

8. A linear position sensor as claimed in claim 7, wherein said sensing means comprises a pair of hollow, tubular sensing elements made of a magnetically saturable material and at least one sense wire is threaded through each of said sensing elements, said sense wires being of a relatively small diameter with respect to said large diameter wires and being connected to the terminal ends of said large diameter wires so as to make electrical connection thereto.

9. A linear position sensor as claimed in claim 7, wherein said sensor comprises an end cap for closing off the end of said housing that is remote from said closure wall and wherein said housing and said end cap are constructed so that said end cap is slideably movable relative to said housing with said end cap being in contact with said wire support block so as to control the position of said end cap relative to said housing and to adjust the position of said support means and said sensing means relative to said control means and said magnets.

10. A linear position sensor as claimed in claim 9, wherein said sensing means comprises a pair of hollow, tubular sensing elements made of a magnetically saturable material and at least one sense wire is threaded through each of said sensing elements, said sense wires being of a relatively small diameter with respect to said large diameter wires and being connected to the terminal ends of said large diameter wires so as to make electrical connection thereto.

11. A linear position sensor as claimed in claim 4, wherein said coil springs are positioned so as to bias said control means in a direction away from said closure wall.

12. A linear position sensor as claimed in claim 4, wherein said coil springs are positioned so as to bias said control means in a direction toward said closure wall.

* * * * *